US 6,682,330 B2
(12) United States Patent
Kössl

(10) Patent No.: US 6,682,330 B2
(45) Date of Patent: Jan. 27, 2004

(54) FORMING DEVICE FOR AN EXTRUSION PLANT

(75) Inventor: Reinhold Kössl, Wartberg/Krems (AT)

(73) Assignee: Greiner Extrusionstechnik GmbH, Kremsmünster (AT)

(*) Notice: Subject to any disclaimer, the term of this patent is extended or adjusted under 35 U.S.C. 154(b) by 358 days.

(21) Appl. No.: 09/754,670

(22) Filed: Jan. 4, 2001

(65) Prior Publication Data

US 2001/0018078 A1 Aug. 30, 2001

(30) Foreign Application Priority Data

Jan. 14, 2000 (AT) .............................................. 61/2000

(51) Int. Cl.[7] .............................................. B29C 47/90
(52) U.S. Cl. .................. 425/71; 425/192 R; 425/326.1; 425/388
(58) Field of Search ...................... 425/71, 190, 192 R, 425/325, 326.1, 388

(56) References Cited

U.S. PATENT DOCUMENTS

| 3,546,745 A | * | 12/1970 | Ball ............................. 425/71 |
| 4,120,926 A | * | 10/1978 | Titz ............................. 264/568 |
| 4,181,487 A | | 1/1980 | Kessler ..................... 425/326.1 |
| 4,468,369 A | * | 8/1984 | Gauchel et al. ............. 264/560 |
| 5,169,650 A | * | 12/1992 | Topf ............................ 425/325 |
| 5,238,376 A | * | 8/1993 | Figuereo ...................... 425/97 |
| 5,516,270 A | * | 5/1996 | Lehtinen ....................... 425/71 |
| 6,287,102 B1 | * | 9/2001 | Franz et al. ................... 425/71 |
| 6,296,464 B1 | * | 10/2001 | Purstinger ................. 425/326.1 |
| 6,394,782 B1 | * | 5/2002 | Grassi ...................... 425/326.1 |

FOREIGN PATENT DOCUMENTS

| DE | 297 16 343 | 12/1997 |
| DE | 199 17 837 | 10/1999 |

OTHER PUBLICATIONS

"Extrusionswerkzeuge für Kunststoffe und Kautschuk", by Walter Michaeli, published in 1991 by Carl Hanser Verlag, Munich/Vienna, pp. 321–329.

* cited by examiner

*Primary Examiner*—Robert Davis
*Assistant Examiner*—Joseph S Del Sole
(74) *Attorney, Agent, or Firm*—Collard & Roe, P.C.

(57) ABSTRACT

The forming device (3) for an extrusion plant (1) having at least one calibrating device (9) comprising at least one calibration tool (24 to 27) having a plurality of calibration dies (29 to 37), arranged one after the other in an extrusion direction (7), has at least one calibration orifice (38) with several forming surfaces QQ to 42) The calibration dies (29 to 37) have end faces (43, 44) spaced at a distance apart from one another in the extrusion direction (7). At least one cavity (51) is formed between at least two immediately adjacent calibration dies (29 to 37) extending from the forming surface through to a passage applying a vacuum to the cavity, and the cavity (Si) is open across a predominant part of the, periphery of the calibration orifice (38) towards the calibration orifice (38) bounded by the forming surfaces.

38 Claims, 6 Drawing Sheets

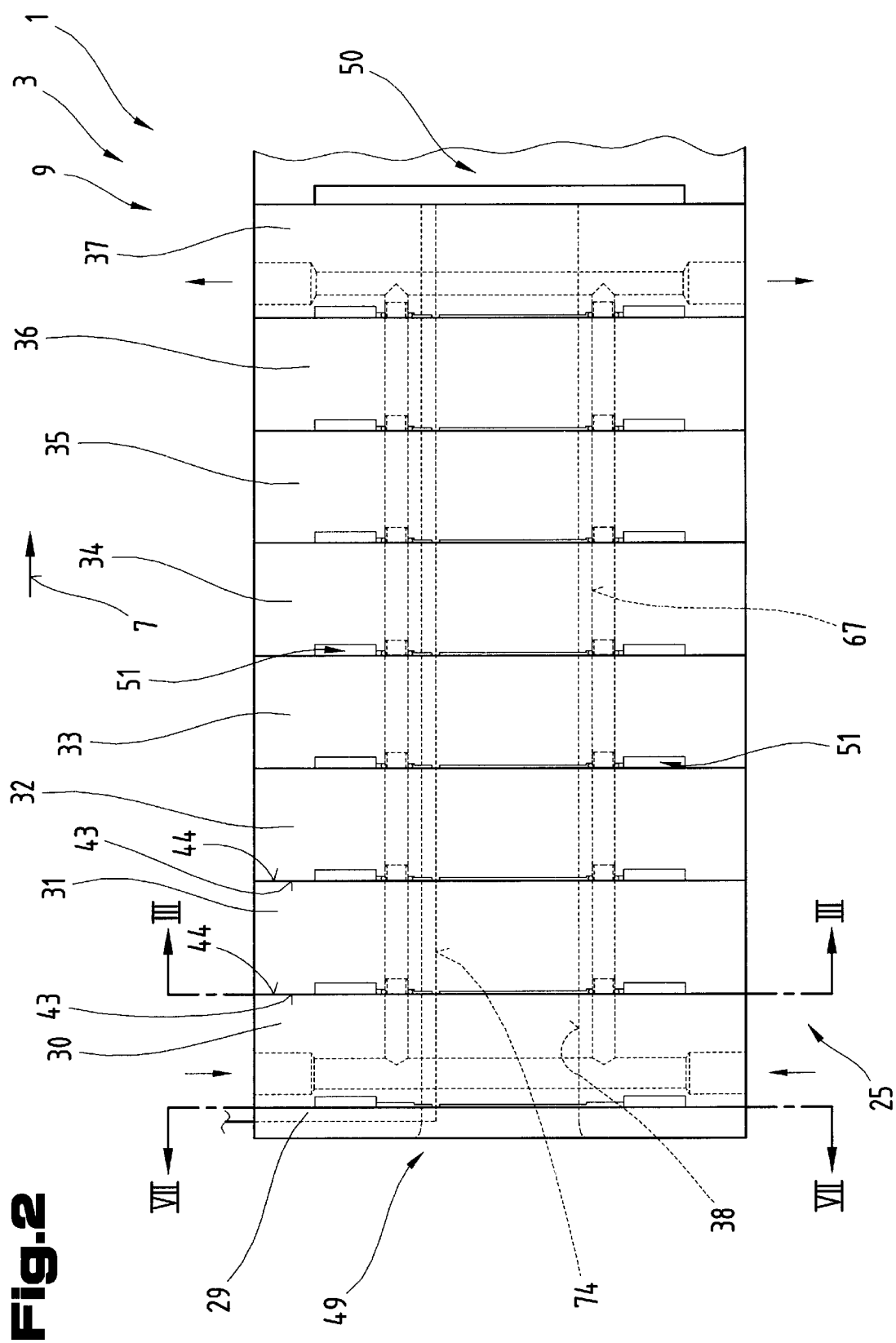

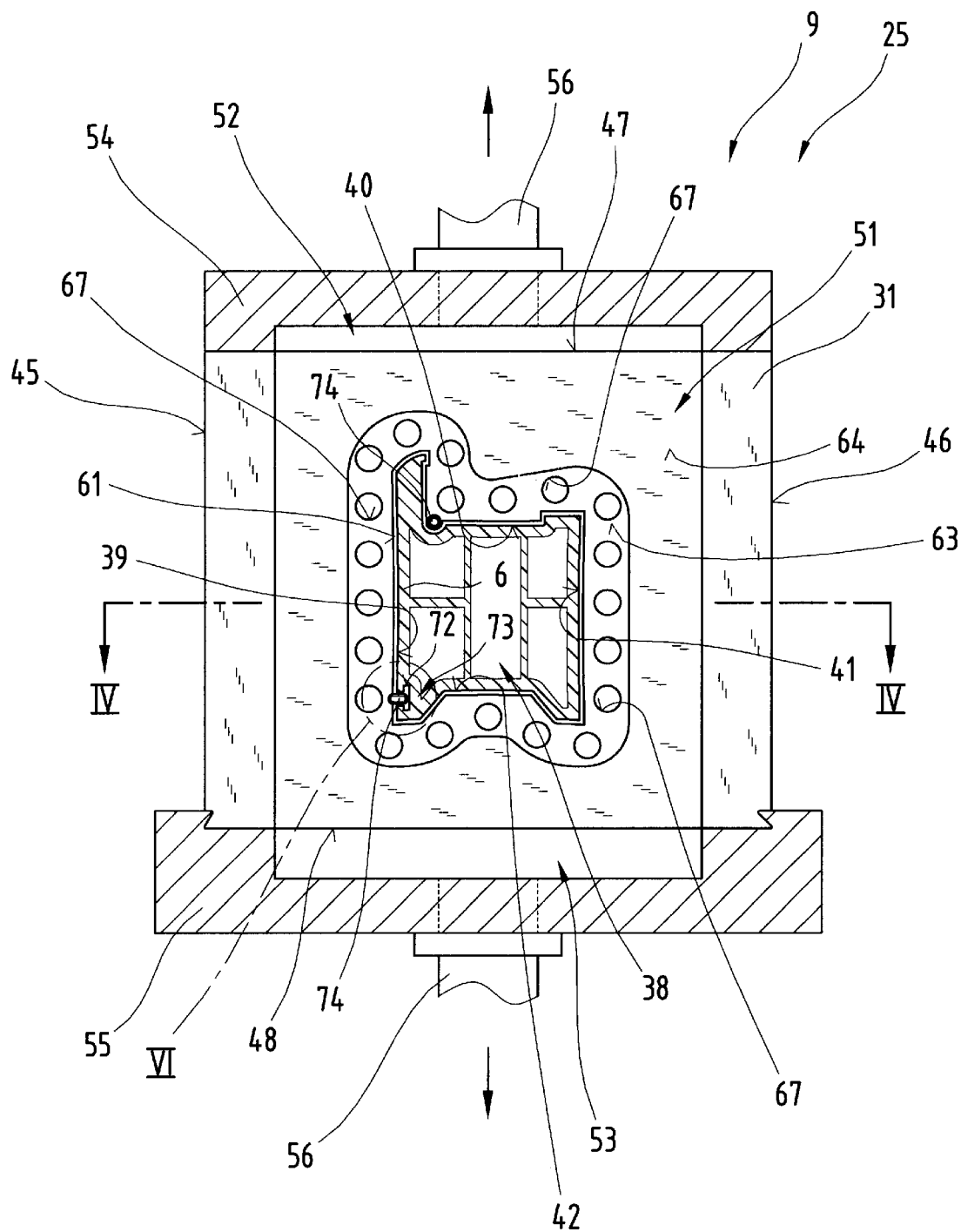

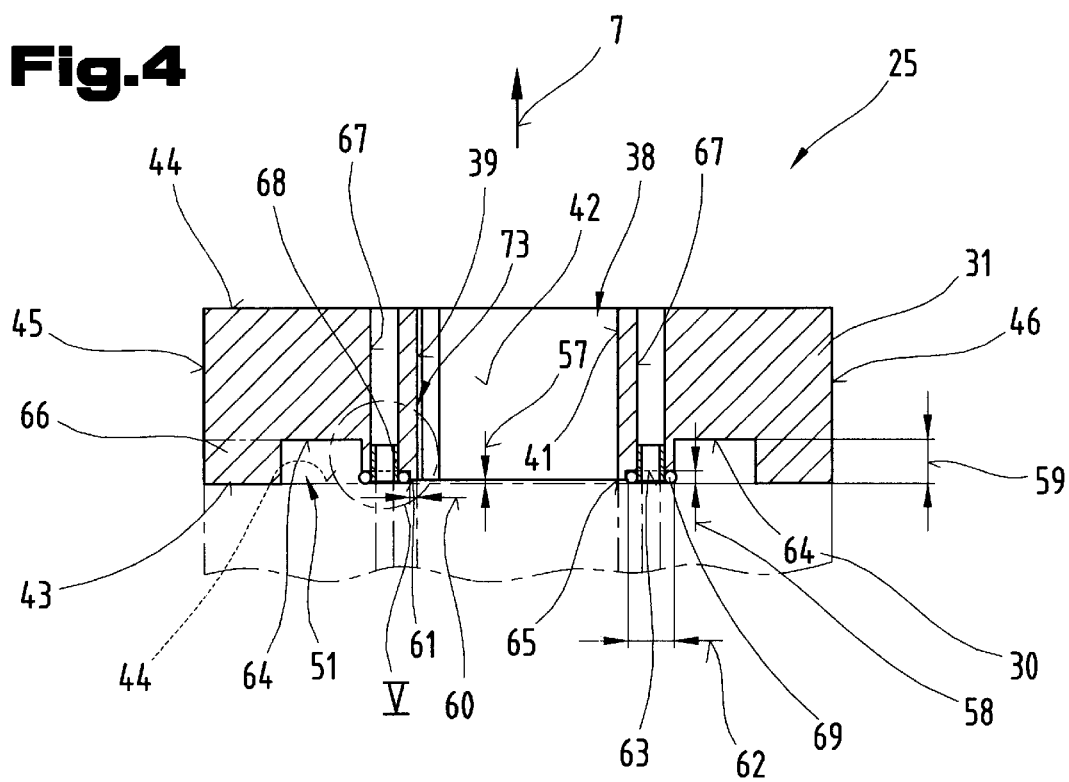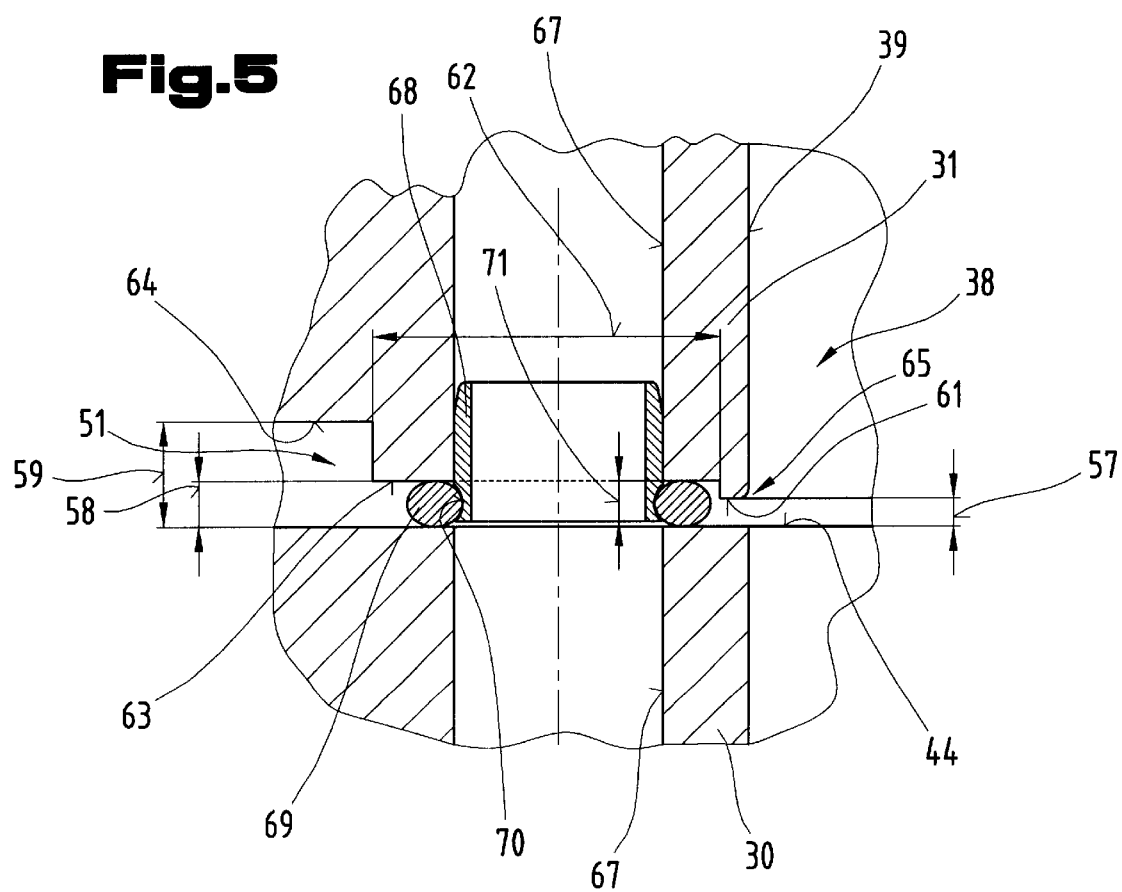

FORMING DEVICE FOR AN EXTRUSION PLANT

BACKGROUND OF THE INVENTION

1. Field of the invention

The invention relates to a forming device for an extrusion plant having at least one calibrating device comprising at least one calibration tool having a plurality of calibration dies arranged one after the other in the extrusion direction, wherein the calibration dies have at least one calibration orifice with several forming surfaces which are applied against at least one object fed through, in particular a section with several cavities, as well as end faces perpendicular thereto and spaced at a distance apart from one another in the extrusion direction extending parallel with one another, with side faces extending between them, wherein the first end face is disposed facing an inlet region and the second end face faces an outlet region for the object fed through and having a cavity between at least two immediately adjacent calibration dies extending from the forming surface through to a passage and opening therein and means co-operating with the calibration device to carry away heat.

2. The Prior Art

A forming device for an extrusion plant is known from U.S. Pat. No. 4,181,487 A1, which has at least one sizing tool with a plurality of side-by-side sizing dies of a plate-type design. The individual side-by-side sizing dies have front faces extending more or less perpendicular or normal to the forming surfaces, channels being formed in at least one of the front faces, extending from the forming surfaces across a distribution passage through to a collection passage. When the sizing dies are placed one against the other, these passages form a plurality of cavities, by means of which a pressure differential can be generated in the object to be fed through. These individual sizing dies co-operate with a plurality of hollow components through which a coolant medium is circulated to carry the heat picked up from the sizing dies co-operating therewith, in the region of their external front faces, away from the object. The disadvantage of this design of sizing dies is that it is not always possible to satisfactorily size the object to be cooled in all applications.

Other forming devices for extrusion plants are known from DE 199 17 837 A1, and from DE 297 16 343 U1 filed by the same applicant, which have at least one calibration device having in particular a plurality of calibration tools disposed one after the other in the extrusion direction, this calibration device and/or the calibration tools being provided with cooling passages through which a coolant medium is circulated. The calibration tool also has forming surfaces which are applied against an object fed through, a seal being disposed at least between the extrusion tool, e.g. a nozzle, of the forming device and the first immediately adjacent calibration tool in the extrusion device so as to form a cavity, sealing the external surface of the object to be fed through from the ambient pressure. However, such a seal may also be disposed between the first calibration tool and at least another calibration tool to form another cavity. These calibration tools are of a building block design and it has not always proved possible to obtain satisfactory calibration results with this embodiment.

Forming devices are also known in which the plastic strands of sections leaving an extrusion nozzle, in particular hollow sections or tubes, are sized to desired external and internal dimensions and frozen in the desired external dimensions or cooled to a pre-set temperature to produce the desired inherent rigidity. Forming devices of this type are described in the book "Extrusionswerkzeuge für Kunststoffe und Kautschuk" by Walter Michaeli published in 1991 by Carl Hanser Verlag, Munich/Vienna, 2nd fully revised and extended edition, in particular pages 321 to 329. Page 323 illustrates an example of a vacuum-sizing process used to produce the external dimensions in which the extruded material leaving the extrusion tool in the form of a hollow section is fed into a calibration tool at a distance downstream of the outlet of the nozzle lip of the extrusion tool, by means of which the external face of the extruded material is applied against the forming surfaces of the calibration tool. The surface of the extruded material is applied against the individual forming surfaces of the calibration tool without any clearance by means of air vents, in particular slits, disposed in the forming surfaces, connected to a vacuum source by means of supply lines. In order to cool the extruded material, the calibration tools are provided with one or more circumferential passages for a coolant medium and the vacuum may be increased in the individual air vents or slits at an increasing distance from the nozzle lip of the extrusion tool. The temperature of the coolant medium is very low relative to the mass temperature of the extruded section and is approximately 20° C. Adjoining this dry calibrator, one or more cooling baths are generally provided, in which the sections can be brought to a sufficient rigidity, partially by applying a vacuum and wetting by means of spray nozzles or by feeding them through water baths at room temperature. In many cases, the surface quality of the extruded materials produced with calibration tools of this type is not satisfactory during the later service life of the forming device.

SUMMARY OF THE INVENTION

The underlying objective of this invention is to propose a forming device, in particular a calibration tool, in which an almost uniform vacuum pressure can be applied to the object whose external surface is to be sized and cooled, thereby simultaneously reducing the complexity of the apparatus used for production purposes.

This objective is achieved by the invention, in particular, in that the cavity or the cavities is or are open across a predominant part of the periphery of the calibration orifice towards the calibration orifice bounded by the forming surfaces. The surprising advantage of this solution is that a cavity or a plurality of cavities is arranged across the greater part of the circumference of the calibration orifice as far as the forming surfaces bounding the calibration orifice, and because of the surrounding cavity, a uniformly homogeneous vacuum can be produced across almost the entire circumference of the section. Another advantage is that a pressure below ambient pressure can be applied, even in contoured sections which are difficult to calibrate, thereby producing a perfect calibration result in these regions. At the same time, because the pressure differential between the cavities of the hollow section and the external surfaces of the object is uniform, the external surfaces of the object can be applied almost fully against the forming surfaces, thereby enhancing the dimensional accuracy of the object to be produced. Because the cavity is designed to run around the circumference of the calibration orifice, the complexity of the production apparatus can be reduced since, if it were of the building bock design, vacuum slits would have to be provided in the die blocks as well as bores to enable a vacuum to be applied to the vacuum slits.

Also of advantage is another embodiment, because the volume of the cavity increases the farther it is away from the forming surfaces, leaving a larger cross section from which air can be sucked out to build up the pressure and, with longer suction paths, enabling losses in pressure to be compensated so that almost homogeneous vacuum can be built up in the region of the external surface of the object.

Other advantages are that the width of the cavity can be selected so that a corresponding flow cross section can be set and, in the cross-over region between immediately facing end faces of calibration dies disposed immediately one after the other, the dimensions of the cavity or the gap between the end faces can be duly selected so that, firstly, any losses in flow can be compensated and, secondly, too excessive a suction on the surface parts of the object through the vacuum slit can be prevented.

Another advantage is that the pressure differential between the cavity of the object and the external surface thereof can be more accurately set.

Feed-through of the object into the individual calibration dies can be improved and made smoother in that there is a radius of between 0.1 mm and 1.0 mm in the transition region between the forming surfaces and the immediately adjacent first part end faces of the calibration dies.

Other advantageous embodiments of the forming device, in particular the calibration dies, are also described and the advantages achieved can be found in the detailed description relating to the drawings.

There are also advantages to be had from other embodiments, since these provide an improved and more efficient dispersion of heat from the object to the calibration dies. Because additional bores running through to the individual vacuum slits can be dispensed with, the flow orifices to the forming surfaces of the calibration orifice can be positioned more accurately, these flow orifices extending through the calibration tools in the extrusion device.

As a result of other advantageous embodiments, a predeterminable quantity of heat can be fed away from profiled sections of the object which are difficult to cool and the pressure differential generated in certain regions can be varied in a simple manner.

Finally, other advantageous embodiments of the forming device are also described and the advantages achieved can be found in the relevant sections of the description.

BRIEF DESCRIPTION OF THE DRAWINGS

The invention will now be described in more detail with reference to embodiments illustrated in the drawings, wherein:

FIG. 2 is a simplified, schematic illustration of a part-region of the forming device illustrated in FIG. 1, in a plan view, with the cover plate removed;

FIG. 3 is a calibration die of the forming device in a view along lines III—III of FIG. 2;

FIG. 4 is a plan view of the calibration die along lines IV—IV of FIG. 3;

FIG. 5 shows a plan view of the cross-over region between two flow orifices of immediately adjacent calibration dies, in section and on an enlarged scale;

DETAILED DESCRIPTION OF PREFERRED EMBODIMENTS

Firstly, it should be pointed out that the same parts described in the different embodiments are denoted by the same reference numbers and the same component names and the disclosures made throughout the description can be transposed in terms of meaning to same parts bearing the same reference numbers or same component names. Individual features or combinations of features from the different embodiments illustrated and described may be construed as independent inventive solutions or solutions proposed by the invention in their own right.

Figure 1:
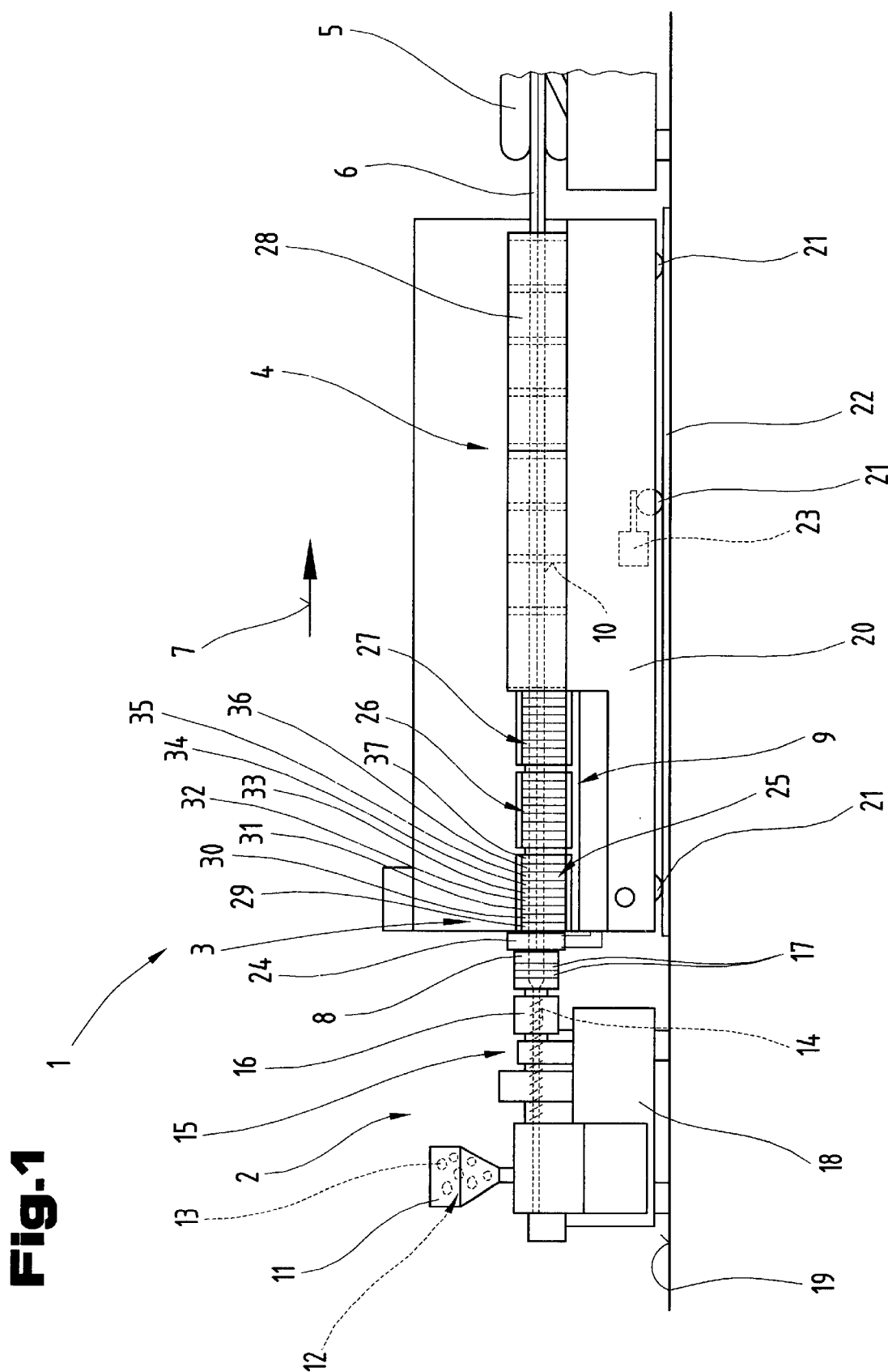
FIG. 1 is a simplified, schematic illustration of an extrusion plant with a forming device as proposed by the invention, seen from a side view.

FIG. 1 illustrates an extrusion plant 1, consisting of an extruder 2, a forming device 3 disposed downstream thereof, a cooling device 4 downstream of the latter which may also be a calibrating device, and a caterpillar track 5 for an extruded object 6. The purpose of the caterpillar track 5 is to draw the object 6, for example a section, in particular a section which is hollow having profiled sections forming a cavity in the interior of the section or made from a solid material, made from plastics and intended to be used for window frames, in the extrusion direction 7—as indicated by the arrow—out from the extruder 2 through the forming device 3 and cooling device 4 to other apparatus, for example saws and similar, not illustrated, by means of which it can be cut into appropriate lengths. In this particular embodiment, the forming device 3 consists of an extrusion tool 8, a calibrating device 9 and supporting plates 10 in the cooling device 4. The supporting plates 10 may additionally be provided in the form of calibration dies which provide an additional supporting function for the object 6.

Located in the region of the extruder 2 is a supply container 11 from which a material 12, for example a mixture or granulate for producing a plastics material 13 is supplied, being fed to the extrusion tool 8 by at least one screw conveyor 14. The extruder 2 also has a plasticiser unit 15, where the material 12 is heated and plasticised under pressure and optionally heated by an additional heating device 16, depending on its inherent properties, as the screw conveyors 14 feed the material 12 along. Before the inlet to the extrusion tool 8, the mass flow of plasticised material 12 is shaped to a section of the desired cross section in transition zones 17.

The extrusion tool 8 with the plasticiser unit 15 and the supply container 11 are supported or mounted on a machine bed 18, the machine bed 18 being disposed on a flat standing surface 19, such as a flat workshop floor, for example.

The calibrating device 9 with the cooling device 4 disposed downstream thereof is disposed or mounted on a calibrating table 20, the calibrating table 20 being supported on rollers 21 on a track 22 secured to the standing surface 19. The calibrating table 20 is mounted on the rollers 21 on the track 22 so that the entire calibrating table 20 with all its equipment and apparatus can be moved to and from the extrusion tool 8 in the extrusion direction 7—as indicated by the arrow. In order to operate this displacement more easily and more accurately, one of the rollers 21 has a drive 23, for example, schematically illustrated by broken lines, which enables the calibrating table 20 to be displaced to the extruder 2 or away from the extruder 2 in a selected and controlled longitudinal motion. Any known solutions and units may be used to operate and control the drive 23.

The calibrating device 9 consists of a plurality of calibration tools 24 to 27, illustrated in a simplified form, disposed one after the other in the extrusion direction 7—as indicated by the arrow—and supported on a mounting plate and designed to operate as a vacuum calibration system, for example, the extruded object 6 being calibrated inside the individual forming or calibration tools 24 to 27.

This calibration process may be set up as a combination of dry and wet calibration or as an entirely dry calibration process. Furthermore, the ambient air may be prevented from getting through to the object 6, at least between the extrusion tool 8 and the first calibration tool 24 and/or at least between the first calibration tool 24 and other calibration tools 25 to 27. Clearly, however, it would also be possible to allow surrounding air to reach the object 6 or to provide water baths at least in certain regions between the individual calibration tools 24 to 27, for example.

The cooling device 4 for the object 6 leaving the calibrating device 9 has at least one cooling chamber in the form of a schematically illustrated housing, divided into regions disposed immediately one after the other by means of schematically illustrated supporting plates 10 in the interior of the cooling chamber 28. However, it would also be possible to place the interior of the cooling chamber 28 at a pressure below atmospheric pressure.

As it leaves the extrusion tool 8, the object 6 assumes a shape of cross section predetermined by the extrusion tool 8, which is duly calibrated and/or cooled in the calibrating tools 24 to 27 forming the calibrating device 9. Its peripheral regions are cooled to the degree that its external shape is stable and its dimensions fixed accordingly. After the calibrating device 9, the object 6 is fed through the cooling device 4 for additional cooling and optionally calibration, any residual heat in the object 6 being fed away.

As may be seen from this simplified diagram, at least one of the calibrating tools 25 to 27 consists of a plurality of calibrating dies 29 to 37 arranged one after the other, the design of the individual calibrating tools 25 to 27 being described in more detail with reference to the other drawings.

FIGS. 2 to 9 illustrate the calibrating tool 25 of the calibration device 9, the calibrating dies 29 to 37 being illustrated on an enlarged scale and in a simplified manner. The individual calibrating dies 29 to 37 have at least one calibration orifice 38 with several forming surfaces 39 to 42, illustrated schematically, against which at least one object 6 fed therethrough is applied. The objects 6 that are fed through will generally be sections used for making window frames, in particular comprising a cavity enclosed by a profiled casing which is divided into other cavities by means of several schematically illustrated stems which may extend in different spatial directions.

The individual calibrating dies 29 to 37 also have end faces 43, 44 extending parallel with one another, perpendicular to the forming surfaces 39 to 42 and spaced apart from one another in the extrusion direction 7 and side faces 45 to 48 extending between them. In the embodiment illustrated as an example here, the two oppositely lying side faces 45, 46 are disposed on either side of the calibration orifice 38 and the other side faces 47 and 48 on the top and bottom face of the calibrating dies. As viewed in the extrusion direction 7 illustrated as an example for this embodiment, the first end face 43 faces an inlet region 49 and the second or other end face 44 an outlet region 50 for the object 6 being fed through.

As may be seen particularly clearly in the diagrams of FIGS. 2 and 4, at least one cavity 51 is provided between at least two immediately adjacent calibrating dies 29 to 37 or the facing end faces 44, 43, extending from the calibration orifice 38 or the forming surfaces 39 to 42 bounding it through to a passage 52, 53, into which it opens. Clearly, it would also be conceivable for only one of the passages 52, 53 to co-operate with the cavity 51, it being possible to select the number of passages freely depending on the vacuum pressure to be generated in the cavity 51. The two passages 52, 53 are preferably recessed in the cover and base plate 54, 55 and, as may be seen from the schematic illustration, at least one of the passages 52, 53 is joined to a suction line 56 via a connector to a suction device, in particular a vacuum generator, not illustrated here.

The immediately adjacent individual calibrating dies 29 to 37 of the calibration tool 25, illustrated in a simplified form, disposed one after the other, are so designed in the region of their end faces 43, 44 that an almost complete seal can be produced in the region of the abutting end faces by laying the surfaces flat one against the other. The same applies for the bearing surfaces of the cover and base plate 54, 55 in the bearing region against the side faces 47, 48, enabling a sufficient seal to be produced and, given that the suction device connects with the passage 52, 53, enabling a pressure below the external ambient pressure to be generated across the entire cavity 51.

As may be seen by referring to FIGS. 3 and 4 together, the cavity 51 or the cavities is/are open around a predominant part of the circumference of the calibration orifice 38 in the direction of by the forming surfaces 39 to 42 bounding the calibration orifice 38. As a result, an air pressure lower than the external air pressure can be applied to the object 6 being fed through in the region of virtually all its external surfaces, in other words those which face the forming surfaces 39 to 42, as a result of which the ambient air pressure prevails in the cavities of the object 6 and a differential pressure can be produced between the cavities of the object and the external surface of the object. As a result of this pressure differential established at least in certain regions around the periphery of the calibration orifice 38, the object 6, which is still in a plastic state, is sucked against the forming surfaces 39 to 42 so that the external surface of the object 6 lies against the forming surfaces 39 to 42 on the one hand and on the other, because of the additional cooling of the object 6—which will be explained in more detail later—the quantity of heat applied during the extrusion process is withdrawn again, thereby establishing the desired cross section of the object 6.

In the embodiment illustrated in this example, the cavity 51 has a varying width 57 to 59 starting from the forming surfaces 39 to 42 and, measured in a direction parallel with the forming surfaces 39 to 42, increasing in width the greater the distance from the forming surface 39 to 42.

As may best be seen from FIG. 4, in the region of the facing end faces 43, 44 starting from one of the forming surfaces 39 to 42 in a direction perpendicular thereto, the cavity 51 has a width 57 of between 0.2 mm and 3.0 mm, preferably between 0.4 mm and 1.0 mm between the calibration dies 30 and 31 illustrated, across a first distance 60 of 0.3 mm to 5.0 mm, preferably 0.5 mm to 2.0 mm, first part end faces 61 being formed on the calibration die 29 to 37 in this region. Accordingly, across the length of the first part end face 61, in other words in the direction of the first distance 60, the cavity 51 is of a tapered shape, it being possible to select the first width 57 depending on the cross section of the object 6 to be calibrated or on the basis of the pressure differential needed between the cavity 51 and the hollow compartments of the object 6 to produce the specified dimensions.

Adjoining the first distance 60, the cavity has a width 58 of between 1.0 mm and 2.5 mm starting from this first distance 60 and continuing across a distance 62 of 6.0 mm to 20.0 mm also in a direction perpendicular to the forming surfaces 39 to 42, second part end faces 63 again being formed on the calibration die 29 to 37. Adjoining the second distance 62, the cavity 51 is of a width 59 of between 2.5 mm and 10.0 mm forming third part end faces 64 on the calibration die. The specified widths 57 to 59 extend respectively starting from the end face 44 of the preceding calibration die 29 to 36 as far as the part end faces 61, 63 and 64.

In the embodiment illustrated as an example here, the part end faces 61, 63 and 64 are aligned parallel with the end faces 43, 44 but spaced apart therefrom by widths 57 to 59. Because of the varying widths 57 to 59, the volume of the cavity 51 becomes wider, the larger the space or distance from the calibration orifice 38, so that flow losses incurred as the vacuum pressure builds up in the cavity 51 can be compensated, even across longer flow paths, through to the region of the first part-end faces 61 so that the vacuum pressure around the periphery of the calibration orifice 38 is more or less uniform. As a result, a uniform pressure differential between the external face and the cavity of the object 6 can be generated across virtually the entire circumference of the object 6 to be cooled.

In order to be order to place differing wall thicknesses of the object 6 under vacuum pressure and generate the intended pressure differentials around the periphery, it would clearly also be possible to vary the width 57 between the first part end face 61 and the other end face 44 of the immediately preceding calibration die 30 associated therewith around the periphery of the calibration orifice. In this case, care should be taken to ensure that the vacuum pressure in the region of the cavity 51 is selected so that the pressure differential generated between the cavities of the object 6 and the cavity 51 is adapted to the degree of cooling of the object 6.

If the object 6 to be cooled is still relatively soft, i.e. is still plastic, the pressure differential will need to be smaller than in the region where the object has been cooled more and the outer skin of the object 6 has already assumed a certain degree of natural rigidity. If too high a pressure differential were selected, there could be a closing-up in the region between the first part end face 61 and the other end face 44 of the immediately preceding calibration die facing it and this would damage the object 6 to be cooled. The external surface of the object 6 would be sucked into the gap between the first part end face 61 and the other end face 44 to a certain extent, thereby causing the object to close up across the periphery of the object 6. In order to improve the passage of the object 6 to be cooled through the individual calibration dies 29 to 37, it is of advantage to provide a radius 65 of between 0.1 mm and 1.0 mm in the transition region between the forming surfaces 39 to 42 and the immediately adjacent first part end faces 61. However, it would also be possible to use any other dimension for the radius 65.

In the region of the two opposing side faces 45, 46, being vertically aligned in the embodiment described in this example, the cavity 51 is bounded by at least two strip-shaped structural parts 66 at the end remote from the calibration orifice 38, schematically illustrated by a broken line in the left-hand region of FIG. 4. However, it would also be possible for the strip-shaped structural parts 66 to be integrally joined to the calibration dies 30 to 37, the individual calibration dies being made in a single piece. This will be the case if the cavity 51 is designed to have a recess in one of the end faces 43, 44 of the calibration dies 30 to 37. This recess may be produced by milling, for example, the milling depth duly matching the width 57 to 59 needed to form the cavity 51. In the example illustrated as an embodiment here, in particular the diagram given in FIG. 3, the cavity 51 opens into at least one passage 52, 53 in the region of the other opposing side faces 47, 48.

In the example illustrated as an embodiment here, the individual part end faces 61, 63 and 64 face the inlet region 49 of the object 6 being fed through the calibration device 9. However, it would also be possible for the individual part end faces 61, 63 and 64 to be directed in the region of the other end face 44 remote therefrom—in other words the outlet region 50.

Because the cavity 51 is disposed over almost the entire periphery of the object 6, a plurality of flow orifices 67 for a tempering medium may be provided in the calibration dies 29 to 37 immediately adjacent to the calibration orifice 38, these flow orifices being distributed more or less uniformly around the periphery of the calibration orifice 38, so that heat can be uniformly drawn off across the entire external surface of the forming surfaces 39 to 42 and the object 6 sliding along them.

The individual flow orifices 67 pass through the calibration dies 30 to 37 in an alignment parallel with the forming surfaces 39 to 42 and are perpendicular to the end faces 43, 44. In order to produce calibration dies 30 to 37 of the same type, it is of advantage if the flow orifices 67 in immediately adjacent calibration dies are aligned flush with one another and pass through the calibration dies 30 to 37 in the region of the second part end face 63. By adopting this layout, the tempering medium fed through the flow orifices 67, in particular the coolant, can be fed close to the forming surfaces 39 to 42, thereby producing an efficient dispersion of heat.

Because the second part end face 63 is spaced at a distance from the other end face 44 facing it, a connecting part 68 between the flush-aligned flow orifices 67 needs to be provided for each of the immediately following calibration dies 30 to 37 so that these can be placed in a flow connection and prevent the cooling medium flowing through the flow orifices 67 from getting into the cavity 51, which is placed under vacuum.

If the flow orifices are provided in the form of bores, as illustrated here, the connecting part 68 may be of a tubular design and at least one seal 69 is provided as an additional means of sealing the second part end face 63 and the other end face 44 of the immediately preceding calibration die.

FIG. 5 provides an illustration on a larger scale of the transition region between two flow orifices 67 arranged flush and immediately one after the other in the two calibration dies 30, 31 arranged directly adjacent to one another. As may be seen more clearly here, the width 58 in this embodiment between the second part end face 63 and the other end face 44 of the preceding calibration die 30 is selected so that the seal 69 is pre-tensed by compression in the direction of the flow orifices 67, thereby providing an all-round seal in the transition region between the immediately adjacent flow orifices 67. In order to improve retention and mounting of the seal 69, it is of advantage if a groove-shaped recess 70 is provided in an external peripheral surface of the connecting part 68, in particular in the end region thereof co-operating with the preceding calibration die 30. Clearly, it would also be possible to provide either only one connecting part 68 or only at least one seal 69 between consecutive flow orifices 67 in the transition region between immediately adjacent calibration dies 30 to 37.

As illustrated particularly clearly in the diagram of FIG. 5, the connecting part 68 projects beyond the second part end face 63 by an overhang 71, which corresponds at most to the second width 58 of the cavity 51 in this portion. However, it is also of advantage if the overhang 71 is smaller than the second width 58 of the cavity 51. Clearly, however, it would also be possible to design the connecting part 68 so that it projects into the end regions of the immediately adjacent flow orifices 67, in which case the seal 69 may be dispensed with.

In order to simplify the drawings and for the sake of clarity, these incoming and outgoing lines to and from the individual flow orifices 67 are not illustrated, but it is also possible to group several flow orifices 67 arranged adjacent to one another and preferably cooperating with a forming surface 39 to 41 into individual flow groups and connect these individual flow groups respectively with a common incoming and outgoing line. As a result, differently cooled media may be fed through individual flow groups so that differing quantities of heat can be fed away from the object 6 or the individual forming surfaces 39 to 42, cooling them to differing degrees.

Furthermore, a cooled tempering medium may be fed through one flow group and a heated tempering medium through another, so that internal tension within the section can be compensated, for example. For example, a circuit can be set up delivering into the flow orifices 67 and/or one of the flow groups in the second calibration die 30 and evacuating into one of the last calibration dies 34 to 37 of the calibration tool 25. It should be pointed out that the number of calibration dies 29 to 37 illustrated here was merely chosen as an example and it would be possible to set up a calibration tool with any number thereof one after the other. The number of calibration dies 29 to 37 and hence the resultant length of the calibration tool 25 will depend on the object 6 to be cooled and the amount of heat to be fed away and is freely selectable. The calibration orifice 38 illustrated here is also only intended as an example for a plurality of possible shapes of cross section.

FIGS. 3 and 4 also illustrate how, in order to shape cross sections in the object 6 which have a groove-type shape, a projection 73 may be provided which projects out from the forming face 39 and is bounded by part forming surfaces 72. In order to be able to feed sufficient heat away from this region of the section, at least one additional flow orifice 74 is provided through the projection 73.

Figure 6:
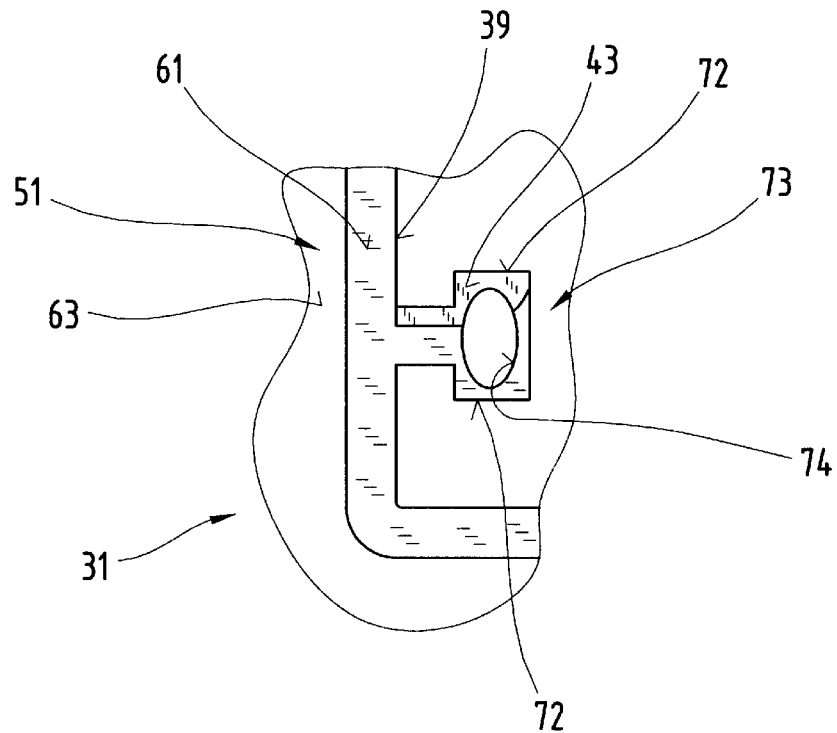
FIG. 6 is an end-on view of the calibration orifice in the calibration die in the region of a projection and on an enlarged scale.

As is more clearly illustrated from the enlarged diagram given in FIG. 6, the projection 73 projects out from the forming face 39 to form a groove-shaped cross section within the object 6 as it is fed through. The other flow orifices 74 are disposed parallel with the first flow orifices 67, in which case the other flow orifice or orifices 74 preferably extend starting from the first calibration die 29 through to the last calibration die 37. However, it would also be possible to opt for other layouts for the other flow orifice 74.

In order to deliver tempering medium, the other flow orifice 74 is connected to a delivery line into the first calibration die 29, not illustrated in detail. Clearly, it would also be possible for the tempering medium to be circulated between the two flow orifices 67, 74 in parallel flow or counter-flow and optionally against the extrusion direction 7. This will depend on the application and is freely selectable.

The other flow orifices 74 passing through the individual calibration dies 29 to 37 may be connected to a suction device in the region of the last calibration die 37, but, irrespective of this, the ends of the other flow orifices 74 open into one of the passages 52, 53 by means of which a pressure lower than the ambient pressure can be applied.

As illustrated in FIG. 6, the flow orifice 74 may be of any shape of cross section in the extrusion direction 7. The two facing end faces, namely the end face 43 of the calibration die 31 and the end face 44 of the immediately preceding calibration die 30 facing it may be disposed so that they lie abutting with one another at least in certain regions around the periphery of the other flow orifice 74.

In the embodiment illustrated here, in the region of the other flow orifice 74 the end face 43 is flush with the strip-shaped structural part 66 illustrated in FIG. 4, where the end face 43 if formed. The first part end face 61 is spaced apart or at a distance from this end face 43 by the width 57, as already described in detail with reference to FIG. 4. Because the first part end face 61 is spaced at a distance from the end face 43, it is possible to build up or assist a vacuum pressure in regions around the circumference of the other flow orifice 74 in the interior of the groove-shaped recess in the surface of the object 6 facing the projection 73.

Figure 7:
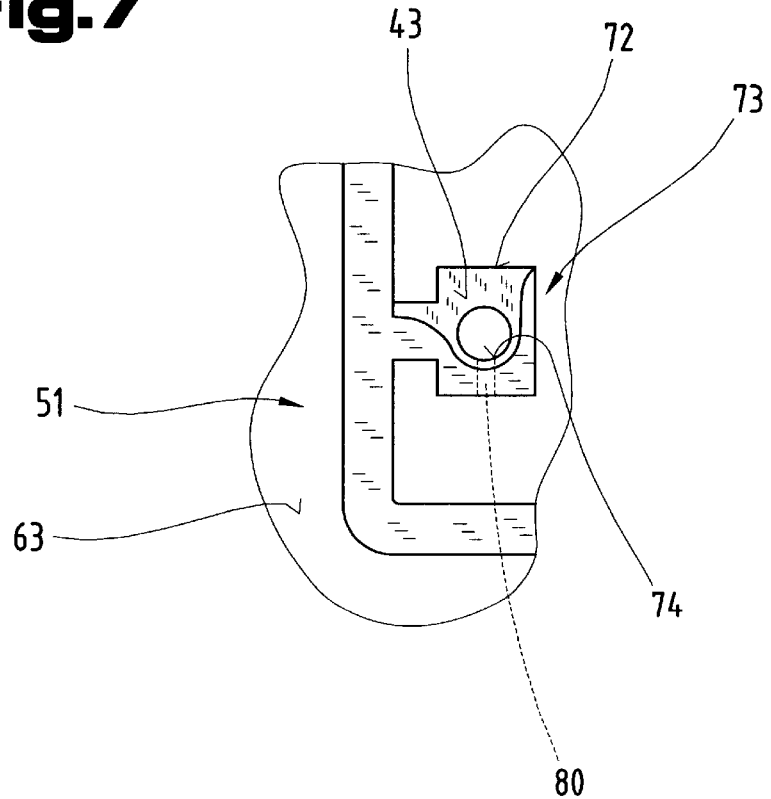
FIG. 7 is an enlarged, schematic diagram in an end-on view of another embodiment of the part-region of the calibration orifice with a projection disposed therein.

In FIG. 7, on the other hand, by contrast with FIG. 6, the two facing end faces 43, 44 of two immediately adjacent calibration dies 29 to 37 are disposed so that they abut one with the other across the circumference of the other flow orifice 74. By contrast with FIG. 6, therefore, it is not possible to generate an additional build-up of another pressure differential or raise the pressure differential between the cavity 51 and the external surface of the object 6. With the embodiment of the projection 73 illustrated here, the tempering medium flows through the other flow orifice 74 without being additionally able to generate a vacuum pressure in the region of the projection 73 starting from the other flow orifice 74.

Unlike the embodiment illustrated in FIG. 6, depending on the vacuum pressure prevailing in the flow orifice 74, it is not possible for tempering medium circulated through the other flow orifice 74 to reach the object 6 because a corresponding pressure differential is generated between the cavity 51 surrounding the calibration orifice 38 and the region surrounding the other flow orifice 74. As a result, the external surface can be applied against the forming part surfaces 72, at least in the region of very small sections shapes.

Figure 8:
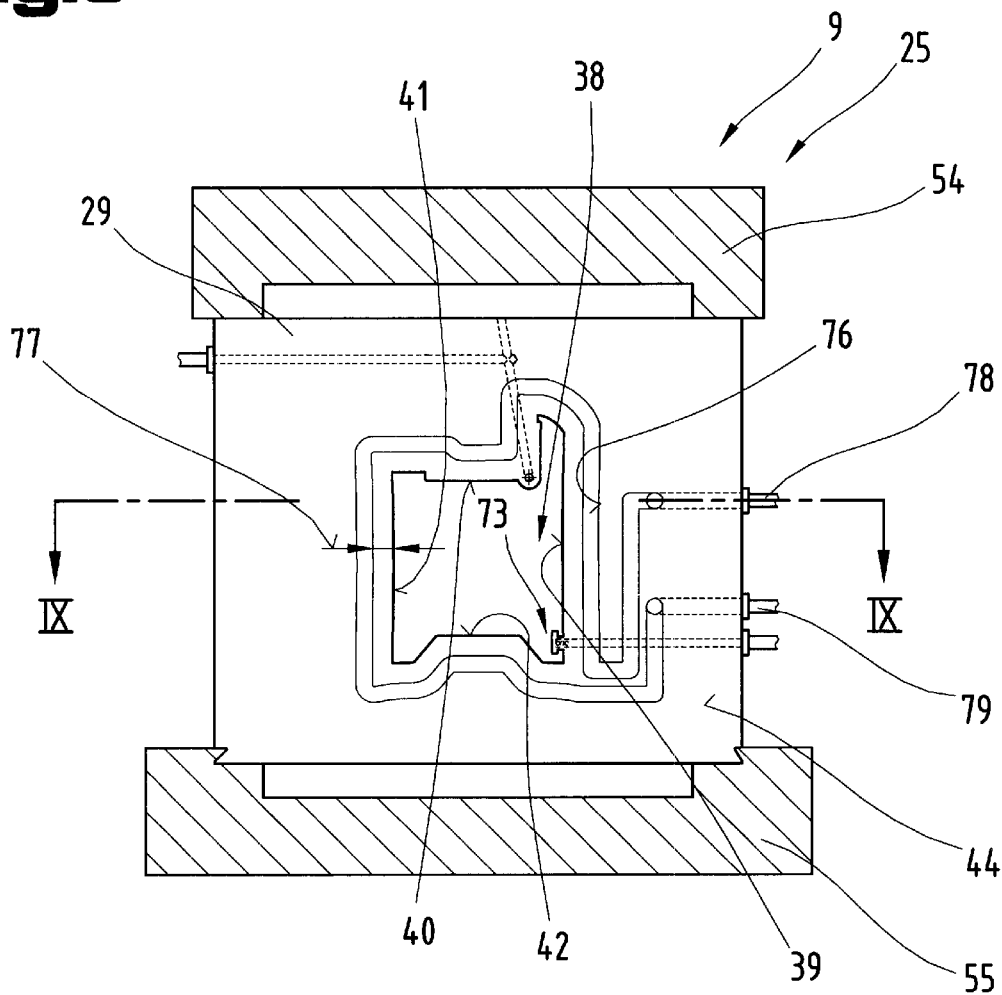
FIG. 8 is a front view of another calibration die of the calibration tool, along the lines VIII—VIII of FIG. 2.
Figure 9:
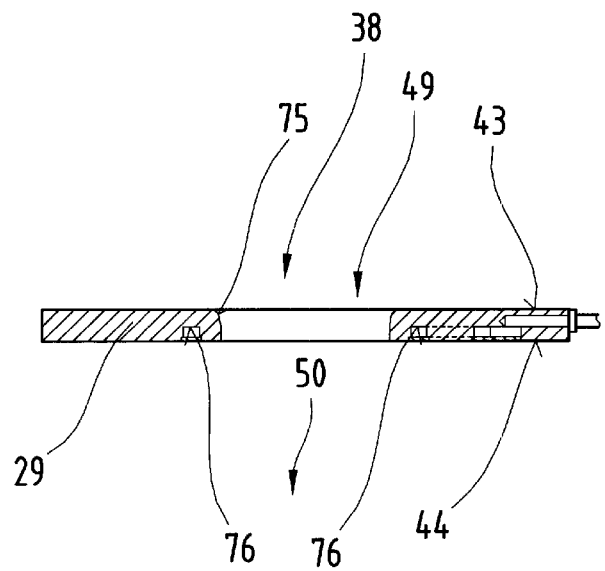
FIG. 9 is a plan view of the calibration die illustrated in FIG. 8, along the lines IX—IX of FIG. 8.

For this example, FIGS. 8 and 9 provide a simplified illustration on an enlarged scale of the calibration die 29, being the first at the inlet region 49, the calibration die 29 in this embodiment having parallel end faces 43, 44. These two end faces 43, 44 are of an approximately flat design in this embodiment, the first end face 43 facing the inlet region 49.

The object 6 is fed through the calibration orifice 38 in this calibration die 29, corresponding in design and shape to that described with reference to the other drawings. The transition region between the forming surfaces 39 to 42 and the first end face 43 is provided with a rounded section 75, which may be selected in a known manner, intended to facilitate feed-through of the object 6, which is still at a relatively high temperature, thereby preventing any surface damage.

In order to remove a corresponding amount of heat from the object entering the first calibration die 29 across almost the entire periphery of the calibration orifice 38, a cooling passage 76 is recessed into the end face 44 facing the outlet region 50 around a predominant part of the periphery of the calibration orifice 38 in this embodiment. This cooling passage 76 is immediately adjacent to the calibration orifice 38, arranged at a slight distance 77, selected so as to be more or less uniform, from the individual forming surfaces 39 to 42. Furthermore, in the region of the end face 44, this cooling passage 76 is closed off by its own structural part in order to prevent the tempering medium from escaping. However, the cooling passage 76 could also be closed off by applying it against the facing end face 43.

This cooling 76 passage is designed as an annular passage although the cooling passage 76 could also be provided in the region of the first end face 43, for example, in other words the one facing the inlet region 49. Clearly, however, it would also be possible to provide several cooling passages 76 in the region of the first end face 43 and/or in the region of the other end face 44. Alternatively, the cooling passages 76 could also be arranged on both sides and simultaneously both in the region of the first end face 43 and in the region of the other end face 44.

As schematically illustrated, tempering medium may be delivered to the cooling passage 76 via a delivery line 78 and then fed back out of the calibration die 29 via a discharge line 79. The layout of the cooling passage and the delivery and discharge lines 78, 79 will depend on the cross section and hence the design of the calibration orifice 38 and may be freely selected in a known manner.

For manufacturing purposes, it is of advantage if the individual calibration dies 29 to 37 are made as single pieces. Clearly, at least some of the calibration dies 29 to 37 may by made in a plurality of pieces if this should be necessary to meet requirements for reasons relating to production and the section. The individual calibration dies 29 to 37 are between 6.0 mm and 60.0 mm thick, preferably between 15.00 mm and 40.0 mm, in the direction perpendicular to the end faces 43, 44. However, it would also be possible to choose thicknesses or thickness values for the calibration dies other than these specified dimensions.

FIGS. 8 and 9 also provide a simplified illustration of the supply to the other flow orifices 74 co-operating with the projections 73. The layout of the delivery passages or delivery lines to the other flow orifices 74 will depend on the geometry of the cross-section of the section or the calibration orifice 38 and is illustrated in a simplified format only here. The delivery lines and supply units etc., have also been left out these drawings in order to retain clarity.

Regardless of the above, as illustrated in a simplified schematic diagram by broken lines in FIG. 7, the other flow orifice 74 is provided with at least one suction passage 80 along its longitudinal extension, starting from the flow orifice 74 extending as far as the calibration orifice 38, in particular to the forming surfaces 39 to 42 and part forming surfaces 72 by which it is bounded. The layout and orientation of this suction passage 80 may be repeated any number of times across the full longitudinal extension of the other flow orifice and in any directions, as a result of which a defined pressure differential can be additionally generated on predefinable surfaces of the object between the cavities of the object 6 and its external surfaces.

The vacuum pressures generated in the individual cavities 51 maybe selected so as to be the same and/or different and are preferably between −0.3 bar and −0.7 bar below the ambient atmospheric pressure. The vacuum pressure generated in the other flow orifices 74 may be between −0.2 bar and −0.8 bar below ambient atmospheric pressure. Depending on the geometry of the flow orifices 74 as well as the flow passing through them, drops in pressure may be generated between the inlet or the delivery line and the outlet or the discharge line within the calibration tools 25 to 27. In addition to this vacuum pressure, it is also possible to feed a tempering medium simultaneously, for example a coolant medium such as water, through these flow orifices 74. The vacuum pressure may be used for this purpose.

Clearly, the individual examples of embodiments and their examples described above and the variants of these embodiments may be construed as independent solutions proposed by the invention in their own right and may be used in any combination with one another. This applies in particular to the layout of the calibration dies 29 to 37 in conjunction with the individual flow orifices 67, 74 and the design of the cavity 51.

For the sake of good order, it should finally be pointed out that in order to provide a clearer understanding of the structure of the forming device, it and its constituent parts have been illustrated out of scale to a certain extent and/or on an enlarged and/or reduced scale.

The tasks underlying the independent inventive solutions can be found in the description.

Above all, subject matter relating to the individual embodiments illustrated in FIGS. 1; 2, 3, 4; 5; 6; 7; 8, 9 can be construed as independent solutions proposed by the invention. The tasks and solutions can be found in the detailed descriptions relating to these drawings.

What is claimed is:

1. A forming device for an extrusion plant having at least one calibrating device comprising at least one calibrating tool, each calibrating tool comprising a plurality at calibration dies arranged one after another in an extrusion direction,
    (a) each calibration die having at least one calibration orifice with several forming surfaces bounding the calibration orifice and applied against an object being extruded, first and second end faces extending perpendicularly to the forming surfaces and parallel to each other, the first and second end faces being, spaced from each other in the extrusion direction, and side faces extending between the first and second end faces, the first end face facing an inlet region and the second end face facing an outlet region for the object being extruded,
    (b) a cavity between facing ones of the end faces of two immediately adjacent ones of the calibration dies extending from the calibration orifice to at least one passage applying a vacuum to the cavity, the cavity being open across a predominant part of the periphery of the calibration orifice towards the calibration orifice and forming
        (1) a first part end face on the calibration die where the cavity has a first width of 0.2 mm to 3.0 mm across a first distance of 0.3 mm to 5.0 mm from the forming surfaces in a direction perpendicular thereto and
        (2) a second part end face on the calibration die where the cavity has a second width of 1.0 mm to 2.5 mm across a second distance of 6.0 mm to 20.0 mm from the first part end face perpendicular to the forming surfaces, and
    (c) means cooperating with the calibration device to carry away heat.

2. The forming device of claim 1, wherein the first distance is 0.5 mm to 2.0 mm.

3. The forming device of claim 1, wherein the width of the cavity across the first distance is 0.4 mm to 1.0 mm.

4. The forming device of claim 1, wherein the cavity forms a third part end face adjoining the second part end face on the calibration die and has a third width of 2.5 mm to 10.0 mm.

5. The forming device of claim 1, wherein a transition region between 0.1 mm and 1.0 mm extends between the forming surfaces and the first part end face.

6. The forming device of claim 1, wherein the cavity is bounded by strip-shaped structural parts on sides remote from the calibration orifice in a region of opposing first ones of the side faces.

7. The forming device of claim 6, wherein the structural parts are integrally joined to the calibration die.

8. The forming device of claim 6, wherein the cavity opens into the at least one passage in a region of opposing second ones of the side faces.

9. The forming device of claim 1, wherein the cavity is formed by a recess in one of the end faces of the calibration die.

10. The forming device of claim 1, wherein the at least one passage is connected by a suction line to at least one suction device.

11. The forming device of claim 1, wherein the first and second part end faces face the inlet region.

12. The forming device of claim 1, wherein the means cooperating with the calibration on device to carry away heat comprises several flow orifices for a tempering medium disposed immediately adjacent the calibration orifice.

13. The forming device of claim 12, wherein the several flow orifices for the tempering medium are uniformly distributed around the periphery of the calibration orifice.

14. The forming device of claim 12, wherein the flow orifices for the tempering medium extend through the calibration die in parallel alignment with the forming surfaces and perpendicularly to the end faces.

15. The forming device of claim 12, wherein the flow orifices for the tampering medium extend through the calibration die in a region between the second part end faces.

16. The forming device of claim 12, wherein the flow orifices for the tempering medium are in flush alignment with each other in immediately adjacent ones of the calibration dies.

17. The forming device of claim 16, comprising at least one seal disposed between immediately adjacent ones of the calibration dies and the f lushly-aligned flow orifices.

18. The forming device of claim 16, comprising a connecting piece for connecting the flushly-aligned flow orifices, the connecting piece penetrating only one of adjacent ones of the calibration dies.

19. The forming device of claim 18, wherein the connecting piece is tubular and has a groove-shaped recess on an external circumferential face in a region of an immediately preceding one of the calibration dies in the extrusion direction.

20. The forming device of claim 19, comprising a seal retained in the groove-shaped recess of the connecting piece.

21. The forming device of claim 18, wherein the connecting piece projects from the second part end face by a distance corresponding substantially to the second width of the cavity.

22. The forming device of claim 12, wherein adjacent ones of the several flow orifices form a flow group and are connected by a common incoming and outgoing line.

23. The forming device of claim 12, comprising a delivery line for the flow orifices arranged in a second one of the calibration dies in the extrusion direction and a discharge line arranged in one of the last ones of the calibration dies in the extrusion direction.

24. The forming device of claim 12, comprising at least one further flow orifice arranged in the calibration die in a region of a projection protruding from one of the forming surfaces and bounded by a part of the one forming surface to form groove-shaped sections in the contour of the object.

25. The forming device of claim 24, wherein the farther flow orifice is aligned parallel to the several flow orifices.

26. The forming device of claim 24, wherein the further flow orifice extends from a first one of the calibration dies through to a last one of the extrusion dies in the extrusion direction.

27. The forming device of claim 26, wherein the further flow orifice is connected, to a delivery line into the first calibration die.

28. The forming device of claim 26, wherein the further flow orifice is connected to a suctofl device in a region of the last extrusion die.

29. The forming device of claim 24, wherein the further flow orifice communicates with at least one suction passage across the longitudinal extension thereof.

30. The forming device of claim 29, wherein the at least one suction passage extends between the further flow orifice and the calibration orifice.

31. The forming device of claim 24, wherein facing end faces of two immediately adjacent ones of the calibration dies are arranged in abutment at least in regions around the periphery of the further flow orifice.

32. The forming device of claim 24, wherein facing end faces of two immediately adjacent ones of the calibration dies are applied against each other across the periphery of the further flow orifice.

33. The forming device of claim 1, wherein a cooling passage is recessed in a first one of the calibration dies in the extrusion direction in a region of the end face facing the outlet region across a predominant part of the periphery of the calibration orifice.

34. The forming device of claim 33, wherein the cooling passage is arranged immediately adjacent the calibration orifice.

35. The forming device of claim 1, wherein the calibration die is of one piece.

36. The forming device of claim 1, wherein the calibration die is composed of several pieces.

37. The forming device of claim 1, wherein the calibration die has a thickness of between 6.0 mm and 60.0 mm in a direction perpendicular to the end faces.

38. The forming device of claim 37, wherein the thickness is between 15.0 mm 40.0 mm.

* * * * *